US008651986B2

(12) United States Patent
Ochab et al.

(10) Patent No.: US 8,651,986 B2
(45) Date of Patent: Feb. 18, 2014

(54) DRIVE CLUTCH FOR A CONTINUOUSLY VARIABLE TRANSMISSION WITH ENGINE BRAKING AND BUILT IN BELT PROTECTION

(75) Inventors: David C. Ochab, Horseheads, NY (US); Matthew J. Cowen, Horseheads, NY (US); Scott C. Schneider, Vestal, NY (US); Steven M. Averill, Beaver Dams, NY (US); Kenneth W. Moyer, II, Painted Post, NY (US); William J. Coon, Elmira, NY (US)

(73) Assignee: The Hilliard Corporation, Elmira, NY (US)

( * ) Notice: Subject to any disclaimer, the term of this patent is extended or adjusted under 35 U.S.C. 154(b) by 869 days.

(21) Appl. No.: 12/793,488

(22) Filed: Jun. 3, 2010

(65) Prior Publication Data

US 2010/0311529 A1 Dec. 9, 2010

Related U.S. Application Data

(60) Provisional application No. 61/217,744, filed on Jun. 4, 2009.

(51) Int. Cl.
*F16H 9/14* (2006.01)
(52) U.S. Cl.
USPC ............................................ 474/11; 474/171
(58) Field of Classification Search
USPC .............. 474/11, 25, 12, 13, 14; 192/105 BA
See application file for complete search history.

(56) References Cited

U.S. PATENT DOCUMENTS 2,909,073 A * 10/1959 Putz ................................. 474/13
3,970,178 A * 7/1976 Densow ................. 192/105 BA (Continued)

FOREIGN PATENT DOCUMENTS

WO WO 2007/010566 1/2007

OTHER PUBLICATIONS

Notification of Transmittal of International Preliminary Report on Patentability, dated Jul. 14, 2011, 12 pages.

*Primary Examiner* — William A Rivera
*Assistant Examiner* — Michael Riegelman
(74) *Attorney, Agent, or Firm* — Drinker Biddle & Reath LLP

(57) ABSTRACT

A drive clutch for a continuously variable transmission that includes an input shaft designed to engage with an engine. A sheave assembly is mounted about the input shaft. A bearing assembly separates the sheave assembly from the input shaft such that the input shaft can rotate independently from the sheave assembly. At least one sheave clutch assembly is positioned about the input shaft. The sheave clutch assembly is configured to provide engagement between the sheave assembly and the input shaft when the rotation of the input shaft increases above a certain threshold value. An axial control mechanism is mounted on the input shaft adjacent to the second sheave. The axial control mechanism controls the movement of the second sheave toward and away from the first sheave as a function of the speed of the input shaft. A continuously variable transmission including the drive clutch and a driven clutch is also disclosed.

23 Claims, 6 Drawing Sheets

(56) References Cited

U.S. PATENT DOCUMENTS

| | | | |
|---|---|---|---|
| 4,345,664 A * | 8/1982 | Anno et al. | 180/230 |
| 4,830,163 A * | 5/1989 | Miyazaki et al. | 192/105 CD |
| 6,149,540 A * | 11/2000 | Johnson et al. | 474/14 |
| 6,569,043 B2 * | 5/2003 | Younggren et al. | 474/19 |
| 6,575,284 B2 * | 6/2003 | Chen et al. | 192/105 CD |
| 6,743,129 B1 * | 6/2004 | Younggren et al. | 474/19 |
| 6,857,515 B2 * | 2/2005 | Barron et al. | 192/105 BA |
| 7,717,250 B2 | 5/2010 | Barron et al. | |
| 2009/0111623 A1 * | 4/2009 | Galletti et al. | 474/25 |

* cited by examiner

DRIVE CLUTCH FOR A CONTINUOUSLY VARIABLE TRANSMISSION WITH ENGINE BRAKING AND BUILT IN BELT PROTECTION

RELATED APPLICATION

The present application is related to and claims priority from U.S. Provisional Patent Application 61/217,744, filed Jun. 4, 2009, the entire disclosure of which is incorporated herein by reference in its entirety.

FIELD OF THE INVENTION

The invention relates to vehicle transmission systems, and in particular a continuously variable transmission system providing engine braking and belt slip protection, usable on for example all terrain vehicles (ATV's) or snowmobiles.

BACKGROUND

Continuously Variable Transmissions (CVT's) are used in applications such as snowmobiles and ATV's to alleviate the need for the driver to shift through a set of fixed gears as the vehicle accelerates through it's range of speeds. Typically the CVT is connected to the output shaft of the vehicle's engine, providing a continuously variable reduction of the relatively higher engine rotation speed, to the relatively lower rotational speed of the vehicles drive system. The drive system could be comprised of either a direct connection from the CVT to the drive axle, or the CVT is used in conjunction with an additional gearbox and/or transmission. The addition of a gearbox is desirable on ATV's to permit the driver to shift between neutral, high, low, and reverse gears. The output shaft of the CVT is connected to the gearbox which, in turn, has an output connected by suitable linkages to the drive axle(s) of the vehicle. Other drive train components, such as differentials, can also be employed between the CVT and drive axle(s) to provide further gearing reduction of the final drive ratio.

Typically a CVT is comprised of a split sheave primary clutch (drive clutch) connected to the output shaft of a vehicle's engine and a split sheave secondary clutch (driven clutch) connected (often through additional drive train components and suitable linkages) to the vehicle's axle(s). An endless, flexible, V-shaped drive belt is disposed about the clutches. Both clutches have a pair of complementary sheaves with one sheave being movable laterally with respect to the other. The lateral position of the movable sheaves in each of the clutches determines the diameter at which the drive belt resides at any moment in time, thus determining the effective gear ratio of the CVT. The drive clutch's sheaves are normally biased apart, such as with a coil spring, so that when the engine is at idle speeds the drive belt is not effectively engaged with the sheaves. As a result there is no driving force transmitted to the driven clutch. The driven clutch's sheaves are normally biased together (e.g., by a torsion spring working in combination with a helix-type cam, as described below), so that when the engine is at idle speeds the belt resides at the outermost diameter of the driven clutch sheaves.

The spacing of the sheaves on the drive clutch is usually dependent upon centrifugal flyweights. As engine speed increases it produces an increase in the rotational speed of the directly connected drive clutch. The increased speed causes the flyweights to apply a force on the movable sheave to urge it towards the stationary sheave. The two sheaves pinch onto the drive belt, causing it to rotate. This, in turn, causes the driven clutch to begin to rotate. An increase in engine speed thus causes a decrease in lateral distance between the drive clutch sheaves. Any decrease in lateral distance between the drive clutch sheaves results in an increase of the diameter at which the drive belt resides about the drive clutch's rotational axis. The clutch, therefore, can be said to be speed sensitive.

As the sheaves of the drive clutch pinch together and force the belt to climb outwardly, the tension of the belt (not being stretchable) pulls itself inwardly between the sheaves of the driven clutch, resulting in a decrease of the diameter at which the drive belt resides about the driven clutch's rotational axis. This smooth movement of the belt inwardly and outwardly on the drive and driven clutches provides seamless changes in the effective gear ratio of the transmission in infinitely variably increments. CVT's are, thus, sometimes referred to as infinitely variable transmissions.

The spacing of the sheaves on the driven clutch is usually controlled by a different mechanism. Although a coil spring could be used to bias the sheaves of the driven clutch together, typically a more sophisticated torque-sensitive system is used to pinch the belt harder as more torque is conveyed by the drive belt to the driven clutch. A generally cylindrical cam with, for example, three cam surfaces (often called ramps) on one end is secured to the output shaft of the driven clutch. Because the ramps are generally helical in shape, this cam is often referred to as a helix. A set of a corresponding number of cam followers (typically buttons or rollers) is mounted to the movable sheave, and the movable sheave is mounted within the driven clutch so that it is free to move laterally and is also rotatable with respect to the shaft. The buttons or rollers are mounted in positions aligned with the ramps of the helix, and a torsion spring typically is used to apply a force that urges the movable sheave rotationally to keep the buttons or rollers engaged against their respective helix ramps.

As torque is transmitted by the drive belt to the driven clutch sheaves, the belt tends to urge the movable sheave laterally away from the stationary sheave, and also tends to rotate the movable sheave with respect to the shaft. Since the buttons are held against the ramps by the torsion spring, the torque being applied by the belt to the movable sheave tends to cause the buttons to slide up the ramps, which in turn tends to push the movable sheave toward the stationary sheave. Thus, the helix converts the torque of the drive belt into a force that pinches the sheaves together, providing good frictional contact between the sheaves and the drive belt. The more torque applied by the belt to the driven clutch, the harder the sheaves of the driven clutch pinch the belt, therefore preventing the belt from slipping under load, and also causing the transmission to downshift for increased power (i.e., urging the belt outwardly between the sheaves of the driven clutch which causes the belt to move inwardly between the sheaves of the drive clutch). Since the spacing of the sheaves in the driven clutch is dependent upon torque, the driven clutch can be said to be torque sensitive.

The actual position of the belt within the sheaves of the drive and driven clutches is determined by the balance of the forces acting on the movable sheaves in the two clutches. In the drive clutch, these forces consist of the coil spring urging the sheaves apart and the speed-dependent force of the centrifugal flyweights, which urges the sheaves together. In the driven clutch, these forces consist of the torsion spring urging the sheaves together along with the torque-dependent force generated by the rollers on the helix ramps.

As mentioned above, the balance of forces acting on the movable sheaves determines the position of the drive belt between the clutch sheaves. In some situations this balance can be disrupted. For example, when the vehicle is traveling along at a given speed and the rider momentarily lets off of the throttle, the speed sensitive drive clutch continues to pinch to the drive belt (since the vehicle's speed is not immediately affected and the engine rpm does not drop instantaneously). At the same moment the torque sensitive driven clutch reduces its pinching force on the drive belt substantially, since the engine torque output drops rapidly. The drive clutch thus overcomes the driven clutch and causes the CVT to tend to up shift. When the rider reapplies the throttle, torque is restored to the driven clutch, but the transmission takes a moment to downshift to the proper gear ratio to accelerate. This downshifting requires the belt to be forced outwardly on the driven clutch, a movement that can be inhibited by the fact that the movable sheave must rotate with respect to the stationary sheave as the torque from the belt causes the rollers to move along the helix ramp. This rotation of one sheave with respect to the other sheave while both in contact with the drive belt, causes scrub on the sides of the drive belt and does not always happen as quickly as would be desired. Accordingly, the vehicle takes a moment to downshift, making it less responsive than would be desirable.

Due in part to the tendency of the CVT to up shift when the rider lets off of the throttle, the CVT does not provide significant engine braking by backdriving the engine. That is, in some types of vehicle drive trains when the vehicle is traveling at a given speed and the throttle is dropped (e.g., to an idle speed), the rotation of the drive wheels of the vehicle will backdrive the drive train causing the engine to rotate at a speed greater than it otherwise would (based on throttle position). The inherent frictional forces present throughout the drive train, including particularly the compression forces present in the engine cylinders, tend to slow the vehicle down. This condition is commonly referred to as engine braking, and can be a desirable and useful feature. The degree of engine braking provided (in vehicles capable of doing so) is dependent upon the gear ratio of the transmission—in higher gears, less braking is provided, and in lower gears relatively more braking is provided. Thus, the tendency of the CVT to up shift when the rider lets off of the throttle makes the CVT less effective in braking the engine to slow the vehicle down.

Conventional CVT systems also do not provide engine braking when the engine is at idle speed. When the engine is simply idling, the primary drive clutch has its sheaves biased apart by a coil spring so that the sheaves do not effectively engage the drive belt. Usually the length of the drive belt is chosen so that it is somewhat loose in the idle position, preventing the vehicle from "creeping". A consequence of this looseness of the drive belt, however, is that the driven clutch is not capable of backdriving the drive clutch (and, therefore, the engine) when the belt and clutches are in the idle position. This could occur while the vehicle is in motion, but the engine is at idle speed.

Also due to the tendencies of the conventional CVT system to up shift with increasing engine speed, and downshift with increasing torque load, there is a point at which the system can be overloaded and the drive belt will slip on the sheave faces. The drive belt can only transfer a limited amount of torque via contact between itself and the sheave faces of both the drive and driven clutches based on the frictional forces between them. If an overload is applied to the system, engine speed will be higher than idle and the engine will be outputting high torque to the CVT system. The drive clutch will attempt to push the belt outwardly on it's sheaves, while the driven clutch will pinch the belt very tightly and attempt to force it outwardly on it's sheaves as well. The lateral force applied to the drive belt by the driven clutch sheaves will attempt to hold the drive belt at the same speed as the driven clutch and subsequent drive train components (which are relatively slower than the rotational speed of the drive clutch and engine speed in an overload condition). This difference in rotational speed will cause the drive belt to slip on the sheaves of one (usually the drive clutch) or both of the clutches. Consequently the belt will burn or wear very quickly and usually will need to be replaced in order for the CVT to return to a properly functioning state.

A common solution to this problem is to use a wet-float centrifugal clutch mounted on the output shaft of the vehicle's engine, located inside the engine crankcase. The centrifugal clutch can engage onto a drum that is connected to the input shaft of the drive clutch on the CVT system. When the engine rotates at a certain rpm the centrifugal clutch engages onto the clutch drum and begins to spin the drive clutch. Under overload conditions the centrifugal clutch will not be able to hold the torque necessary to complete a solid connection between the centrifugal clutch shoes and the clutch drum, thus, not connecting the engine output shaft and the drive clutch input shaft. The slipping action of the centrifugal clutch prevents damage to the drive belt.

However, for engines that do not include a wet-float centrifugal clutch, when it is time to replace an existing CVT unit, the incorporation of a centrifugal clutch is very costly and difficult. Also tuning, repair and replacement of the centrifugal clutch in conventional wet-float systems can be expensive and time consuming.

SUMMARY OF THE INVENTION

The present invention is directed to a drive clutch for a continuously variable transmission. The drive clutch includes an input shaft that is designed to engage with an engine. A support housing is disposed about a portion of the input shaft such that the support housing is rotatable relative to the input shaft. The support housing has a central axis that is coincident with a rotational axis of the input shaft.

A first sheave is disposed about and engaged with a portion of the support shaft so that the first sheave rotates in combination with the support shaft. The first sheave has a rotational axis coincident with the rotational axis of the input shaft. The first sheave has a belt-engaging surface formed on a portion of one face.

A second sheave is disposed about the support shaft and mounted so as to be axially movable relative to the first sheave. The second sheave has a belt-engaging surface formed on a portion of one face that faces the belt-engaging surface of the first sheave. The belt-engaging surfaces define a groove for receiving a belt that is adapted to engage a driven clutch. The first and second sheaves and the support housing form a sheave assembly.

A bearing assembly is located between the input shaft and the sheave assembly so as to permit rotation of input shaft relative to the sheave assembly. That is, the sheave assembly is mounted so that it does not directly engage with the input shaft.

At least one sheave clutch assembly is positioned about the input shaft. The sheave clutch assembly is configured to provide controlled engagement between the sheave assembly and the input shaft. To provide controlled engagement, the sheave clutch assembly includes a clutch hub mounted to the input shaft, an engagement (friction or torque transfer) surface formed on or attached to the sheave assembly, and means for engaging the clutch hub to the engagement surface upon the input shaft rotating at a speed relative to the sheave assembly that is above a threshold value. That is, the sheave clutch assembly is designed so that upon initial rotation of the input shaft, there is no rotation of the sheave assembly until the speed of the input shaft increase above a certain threshold value.

An axial control mechanism is mounted on the input shaft adjacent to the second sheave. The axial control mechanism controls the movement of the second sheave toward and away from the first sheave as a function of the speed of the input shaft.

In one embodiment of the invention the sheave clutch assembly is a centrifugal clutch assembly in which the means for engaging the clutch hub to the engagement surface are a plurality of shoes and springs disposed on the clutch hub. The shoes are radially displaceable in response to rotational motion of the clutch hub. The springs bias the shoes radially toward the input shaft such that the shoes are not engaging the engagement surface. The engagement surface is preferably a drum mounted on either the first or second sheave.

Preferably there are two centrifugal clutch assemblies, one mounted adjacent to the first sheave and the other mounted adjacent to the second sheave. Each sheave includes a drum that is engaged by shoes in an associated clutch assembly.

In one embodiment of the invention, a unidirectional overrunning clutch is positioned between the input shaft and the sheave assembly. The overrunning clutch is designed such that it does not engage the input shaft to the sheave assembly when the input shaft is rotating faster than the sheave assembly. However, when the sheave assembly is rotating faster than the input shaft the overrunning clutch directly engages the input shaft to the sheave assembly. this permits backdriving of the input shaft by the driven clutch.

The axial control mechanism is preferably a tower assembly which includes a base disposed about the input shaft, a plurality of flyweights pivotally attached to the base, and a spider disposed adjacent to the flyweights. The spider includes surfaces against which the flyweights bear as the flyweights pivot. The spider is displaceable relative to the base and is attached to the input shaft. A spring is mounted between the spider and a tower cover. The spring is arranged to urge the second sheave away from the first sheave.

The present invention provides a drive clutch and CVT system that protect the drive belt from slipping and burning during an overload condition, such as when the torque requirements of the vehicle overcome the pinch loads of the sheaves onto the belt, causing it to slip. The drive clutch of the present invention also preferably maintains the drive belt in constant tension between the drive and driven sheaves (i.e., no slack) so as to eliminate belt scrub at initial engagement of the drive clutch.

The drive clutch of the present invention also may incorporate the ability to use the deceleration of the engine for engine braking when needed, allowing the CVT to use the engine compression to slow the vehicle. The preferred construction of the drive clutch of the present invention is as a self-contained unit, thereby facilitating retrofit onto existing vehicles.

Other objects, aspects and advantages of the present invention will become apparent to those skilled in the art upon reading the following detailed description, when considered in conjunction with the appended claims and the accompanying drawings briefly described below.

BRIEF DESCRIPTION OF THE DRAWINGS

For the purpose of illustrating the invention, there are shown in the drawings embodiments that are presently preferred; it being understood, however, that this invention is not limited to the precise arrangements and constructions particularly shown.

DETAILED DESCRIPTION

Figure 1:
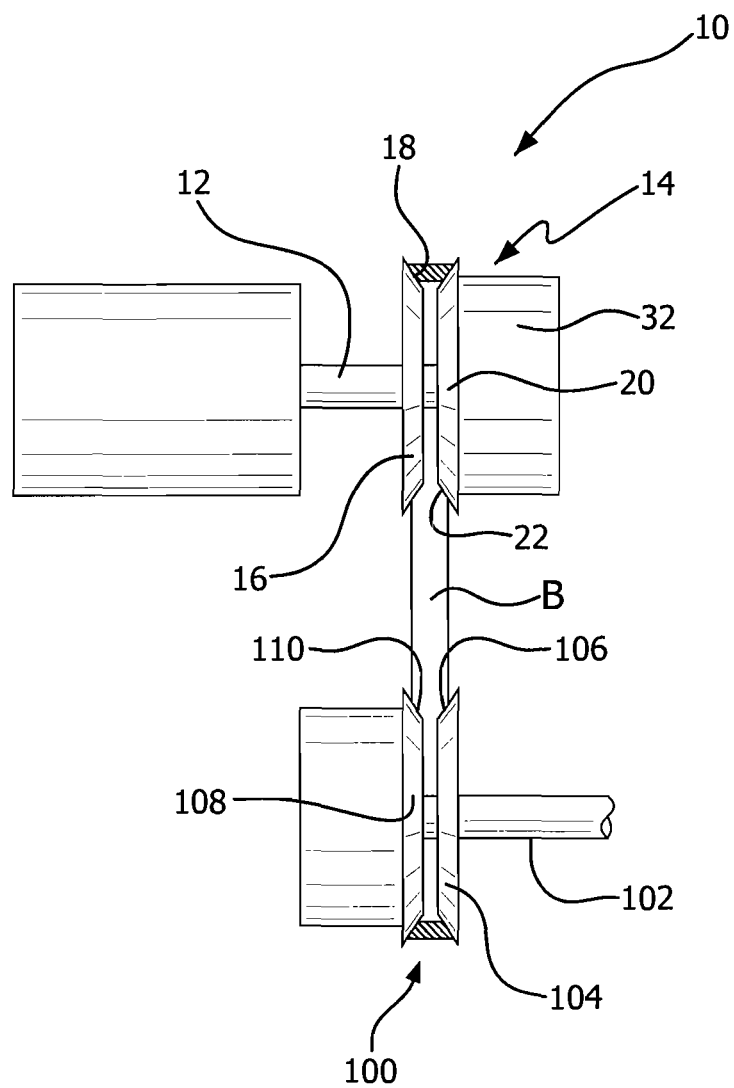
FIG. 1 is a schematic representation of a continuously variable transmission (CVT) according to the present invention.

Referring now to the drawings, which illustrate a preferred embodiment of the invention, a continuously variable transmission (CVT) system is shown for use in a motorized vehicle. While the CVT is useful in many different vehicles, the CVT has particular use on snowmobiles, ATV's and similar vehicles. The CVT facilitates smooth and seamless engine braking at both idle and above-idle conditions, which increases the responsiveness of the transmission during operation. It also has a built in belt protection system, which prevents drive belt damage if an overload were to occur.

The CVT 10 includes or is connected to a rotatable input shaft 12 connectable to an engine of a vehicle (not shown), and a rotatable split sheave primary clutch (drive clutch) 14 connected to the input shaft 12. The drive clutch 14 has a laterally stationary sheave 16 with an inner belt-engaging surface 18 and a laterally movable sheave 20 with a complementary inner belt engaging surface 22. As will become apparent below, the stationary sheave is only laterally stationary since it is mounted so as to be able to, under certain circumstances, rotate about the input shaft. The stationary sheave 16 houses or includes a drum 24 that is part of a first centrifugal clutch 26. The drum 24 may be a separate component or may be formed integral with the stationary sheave 16. The centrifugal clutch 26 also includes a plurality of clutch shoes 36 that are slidingly disposed in a clutch hub 25 which is connected or engaged to the input shaft 12 through any conventional means.

The movable sheave 20 also houses or includes a drum 28 that is part of a second centrifugal clutch 30. As with the stationary sheave, the drum 28 may be formed integral with or attached separately to the movable sheave 20. The second centrifugal clutch also includes a plurality of clutch shoes 36 and clutch hub 35 that are indirectly connected to the input shaft 12 through a tower assembly 32 as will be discussed below. As shown, the clutch hub 35 is bolted to a portion of the tower assembly 32. As such, the tower assembly 32 and the movable sheave 20 are rotationally disconnected from one another until the RPM of the input shaft is significant enough to cause the shoes of the second centrifugal clutch to engage the drum on the movable sheave. It should be readily apparent that the first and second centrifugal clutches do not need to be the same.

The centrifugal clutches 26, 30 are preferably tunable per each application to achieve desired clutch performance characteristics. The centrifugal clutches can be tuned by changing spring rates of the springs 34, shoe 36 shape, shoe material, shoe weight, etc., to adjust the engagement speed, and torque capacity. Tuning of centrifugal clutches is well known in the art. One particular tuning arrangement is described in U.S. Pat. No. 7,717,250 (application Ser. No. 11/649,154), owned by the assignee of this application, which is incorporated herein by reference in its entirety. The centrifugal clutches can be any suitable centrifugal clutch design, including the centrifugal clutches described in U.S. Pat. No. 6,857,515 and U.S. Pat. No. 7,717,250. U.S. Pat. No. 6,857,515 is incorporated herein by reference in its entirety. The shoes 36 are retained in their respective clutch hubs 25, 35 by a shoe retaining plate 38, which is typically made of a low friction bearing material, such as Garlock's DU® bearing material. The low friction material is intended to limit or prevent load transfer from the centrifugal clutch assembly through the retaining plate into the sheave. Thus, at idle when the shoes are not engaged, the retaining plate will not cause any significant drag on the sheave. Also, in an overload condition where the shoes are slipping on the engagement surface, the bearing material allows the retaining plate to slip against the sheave. It is contemplated that certain applications may require higher torque loads, in which case the bearing material can be replaced with material having a higher coefficient of friction to increase the clutches' torque capacity by increasing it's frictional forces on the sheave's drums faces by the flyweights during operation (i.e., as the flyweights urge the tower assembly toward the movable sheave), the shoe retaining plate 38 will press into the rear face of the movable sheave.

When the engagement or threshold speed (RPM) of the input shaft is reached, the clutch shoes 36 translate radially until they frictionally engage the drums 24, 28 thereby creating a connection (engagement) through their respective clutch hubs 25, 35 between the sheaves 16, 20 and the input shaft 12. This results in the input shaft causing rotation of the sheaves and, thus, permitting torque transfer to the CVT. At engine idle or low engine speeds (i.e., the RPM of the input shaft is under the desired engagement point and the flyweights are not pushing against the retaining plates) the centrifugal clutch shoes 36 are in a rest or disengaged position which is retracted from the drums by springs 34 so that they are not contacting the drums 24, 28 and, thus, are not transferring torque to the CVT system.

The spacing of the sheaves 16, 20 on the drive clutch at idle is preset with a stop 40. In the illustrated embodiment, the stop 40 is a snap ring attached to a retention groove 41 formed on a support housing 46, which is preferably tubular in shape, on the stationary sheave 16. The spacing is designed to provide continuous engagement with the belt even at idle, thus preventing the belt from bottoming out on the support housing 46. In order to control the spacing between the sheaves (belt gap), it is contemplated that one or more shims may be included between the stop 40 and the movable sheave to adjust the gap spacing. This allows for control of the transmission ratio to be adjusted at start-up.

During engagement of the sheaves, their spacing is dependent upon the engine RPM and the torque being transmitted. As noted above, the second, movable sheave 20 is laterally movable relative to the input shaft and the first sheave 16. Lateral movement of the second sheave 20 is controlled by the tower assembly. The tower assembly includes a set of centrifugal flyweights 42, preferably three or more, that are pivotally mounted to a tower base 43. The base 43 include sets of spaced about mounting brackets 45 between which arms of a spider 48 are located. The spider 48 is held between the brackets 45 through a tower cover 50 which is bolted to the brackets. The spider is engaged or connected to the input shaft 12 through any conventional mechanism, such as threads.

As is well known in the art, the rotational speed of the input shaft 12 causes the centrifugal flyweights 42 to pivot radially outwardly. As they do so, the radial motion is translated, through bearing against rollers on radial arms of the spider 48, into an axial or lateral force on the second sheave 20 urging that sheave toward the first sheave 16. Hence, as engine speed increases, the flyweights 42 apply a force on the movable sheave to urge it towards the stationary sheave. An increase in engine RPM thus causes a decrease in lateral distance between the drive clutch sheaves. Any decrease in lateral distance between the drive clutch sheaves results in an increase of the diameter at which the drive belt resides about the drive clutch's rotational axis. As such, the belt B rides near the center of the clutch 10 when the engine (and, hence, the drive clutch) is rotating at slow speeds. At higher speeds the centrifugal flyweights 42 urge the second sheave 20 toward the first sheave 16, thereby pinching the belt and causing it to move outwardly between the sheaves. The centrifugal flyweights 42 can also be tuned, as is well known in the art. Different shapes and weights can be used on the flyweights to achieve different shifting characteristics of the second (movable) sheave.

The spider 48 is preferably threaded directly onto the input shaft 12. A coil spring 52 is positioned between the spider 48 and the tower cover 50 and is configured to urge the cover and, therefore, the second sheave 20 away from the first sheave 16. Tower assemblies are well known in the art and, therefore, no further description is necessary.

One of the unique features of the present invention is the ability to tune the centrifugal clutches independent from the normal functioning of the CVT. Thus the tuning of the centrifugal clutches does not affect the operation of the flyweights or the tuning of the CVT itself. As such the centrifugal clutches can be tuned to the desired performance of the clutches. For example, the centrifugal clutches are preferably tuned to engage at a desired engine RPM and smoothly transmit torque from the input shaft of the drive clutch to the sheaves, which in turn drive the belt B. A torque curve can be specified for a given vehicle and the clutches are tuned to hold certain desired torque values at certain engine rpm's. Under overload conditions (torque values greater than the torque curve) the centrifugal clutches are not able to transmit the required amount of torque to the sheave's drums in order to rotate the subsequent drive train. The pinch between the sheaves (which is generated at least in part by the helix and spring in the driven clutch and flyweights in the drive clutch) produces a pinching force on the belt (generating a frictional force between the sheaves and the belt) that is greater than the friction generated by the clutch shoes on the drum. As such, the clutch shoes will slip on the drum surfaces, preventing sufficient torque to be transferred to the sheaves to overcome the applied loads, thus, minimizing or eliminating the occurrence of the belt slipping on the sheaves as currently occurs in conventional CVT systems. In the present invention, the sheaves 16, 20 and drive belt B remain stationary (or rotate slower than the drive clutch) with the driven clutch, and are at this point independent of the drive clutch. When this occurs, the rider will realize that the limits of the CVT have been exceeded for the given conditions and can make proper adjustments (e.g., shifting the vehicle gearbox into low gear). Slipping of the centrifugal clutches in the drums of the sheaves during overload conditions prevents belt burn and unnecessary wear on the drive belt, increasing belt life significantly.

The sheaves 16, 20 in the resting position are in contact with the drive belt B and stay in contact with the drive belt at all times. This protects the belt as compared to a conventional CVT. In conventional CVT systems, as the drive system increases from idle (where the belt is not in contact with the sheaves) to a speed above idle (where the sheaves engage the belt to drive), there is momentary belt scrubbing.

In the present invention, the sheave assembly (stationary and movable sheaves) are disconnected from the input shaft 12. More particularly, a bearing assembly 44 is positioned between the input shaft 12 and the support housing 46. The bearing assembly 44 permits the input shaft 12 to rotate relative to the support housing 46 and the sheave assembly 16, 20. The bearing assembly may be a conventional caged roller bearing with an inner race or hub mounted on the input shaft 12 and an outer race mounted to an inside diameter of the support housing 46. Various conventional roller bearings and/or bushings can be used as the bearing. Rolls or bearings between the races permit the input shaft 12 to rotate freely relative to the support housing.

Figure 2:
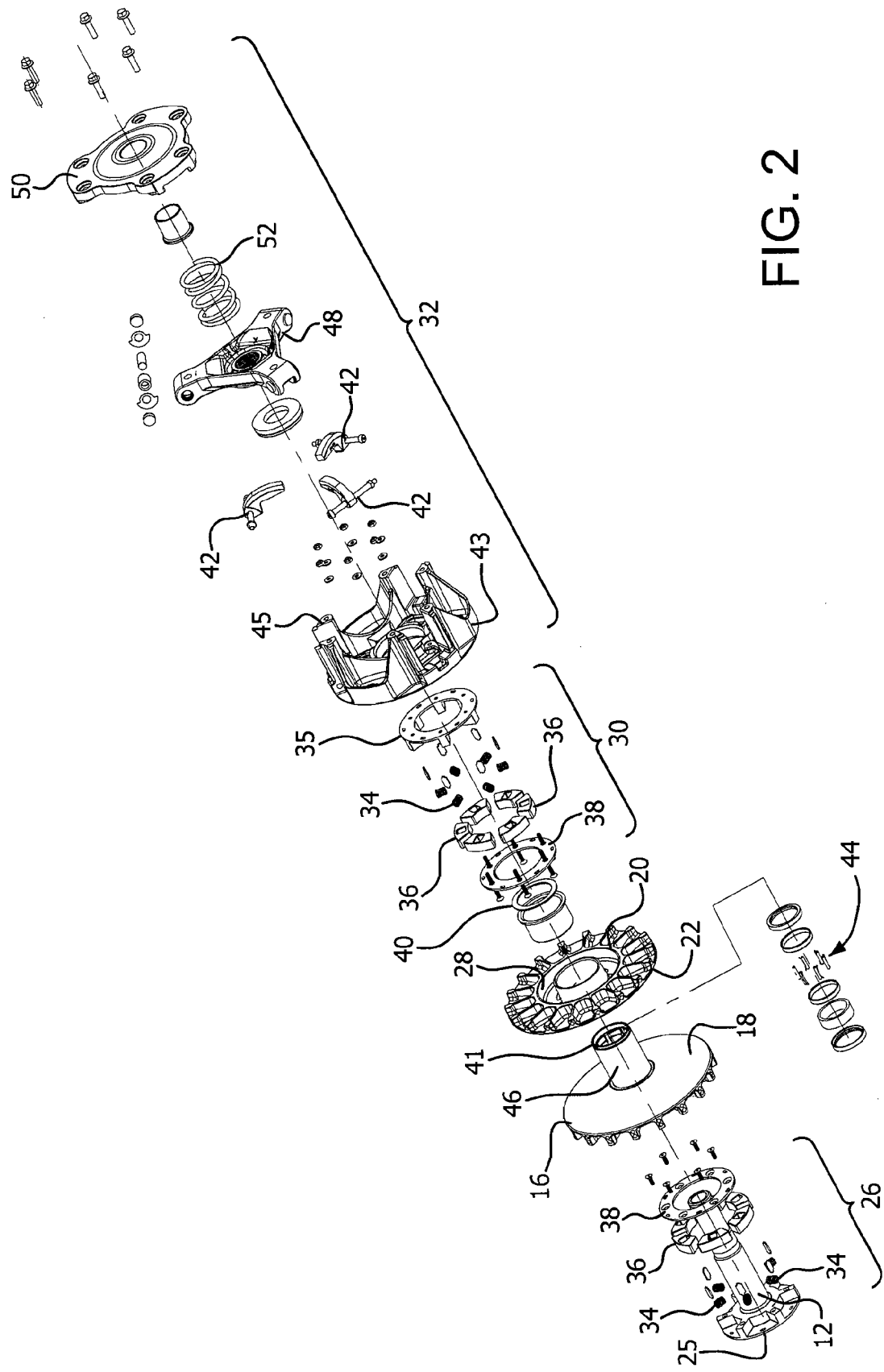
FIG. 2 is an exploded view of a drive clutch for the CVT of FIG. 1.
Figure 3:
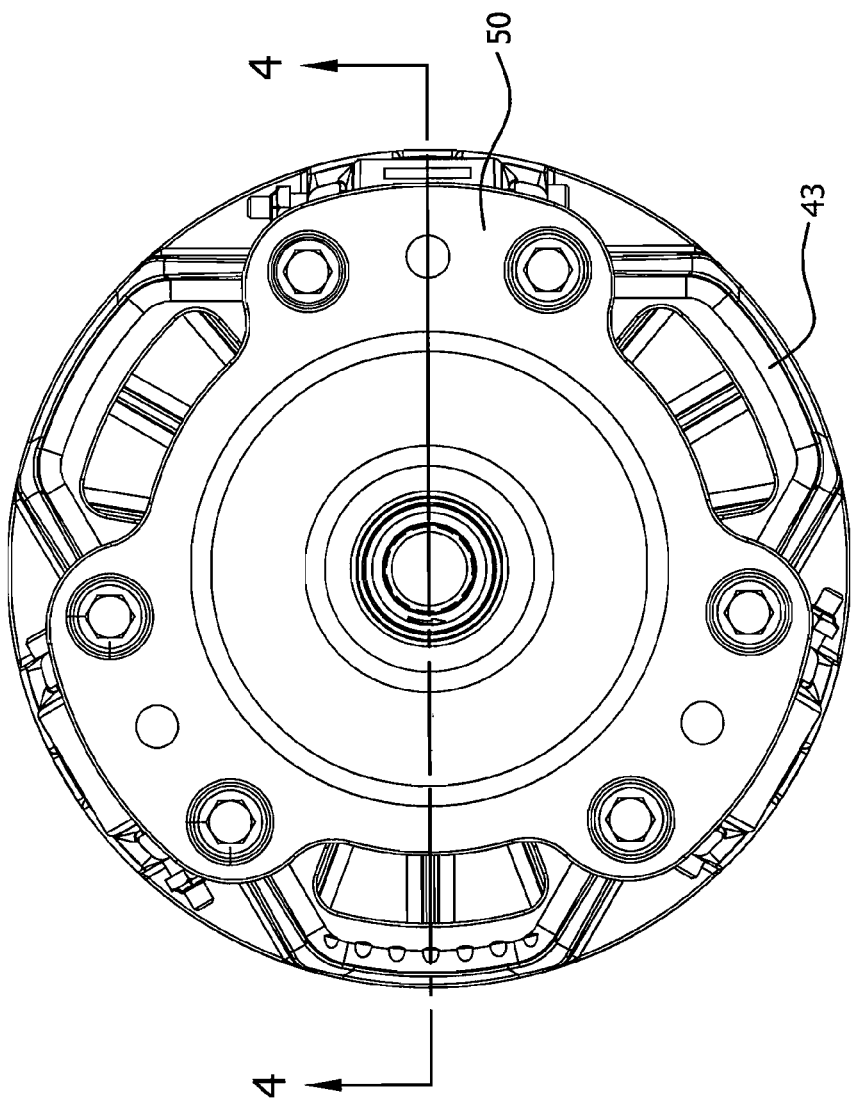
FIG. 3 is a front view of the drive clutch of FIG. 2.
Figure 4:
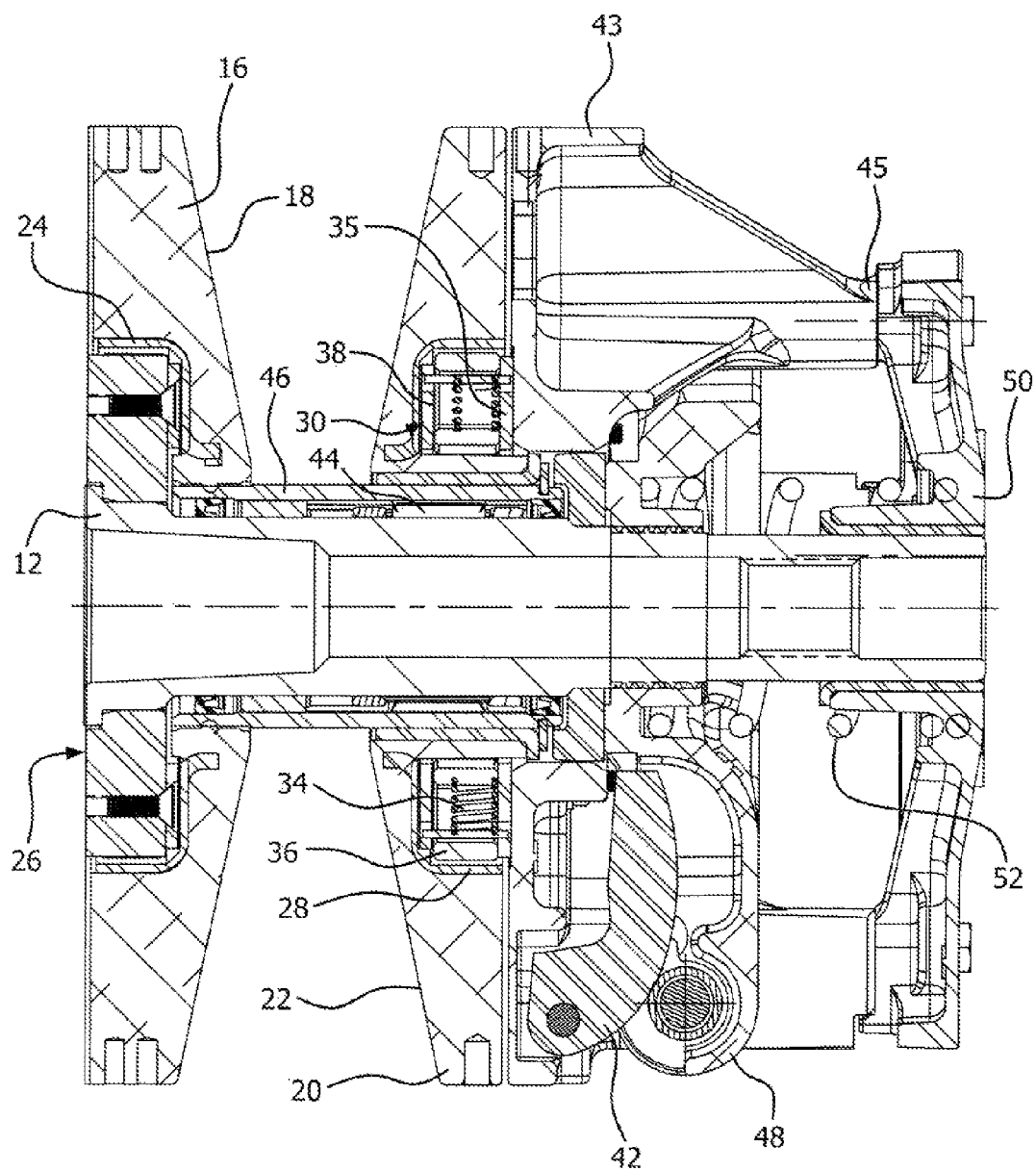
FIG. 4 is a cross-sectional view of the drive clutch taken along lines 4-4 in FIG. 3.
Figure 6:
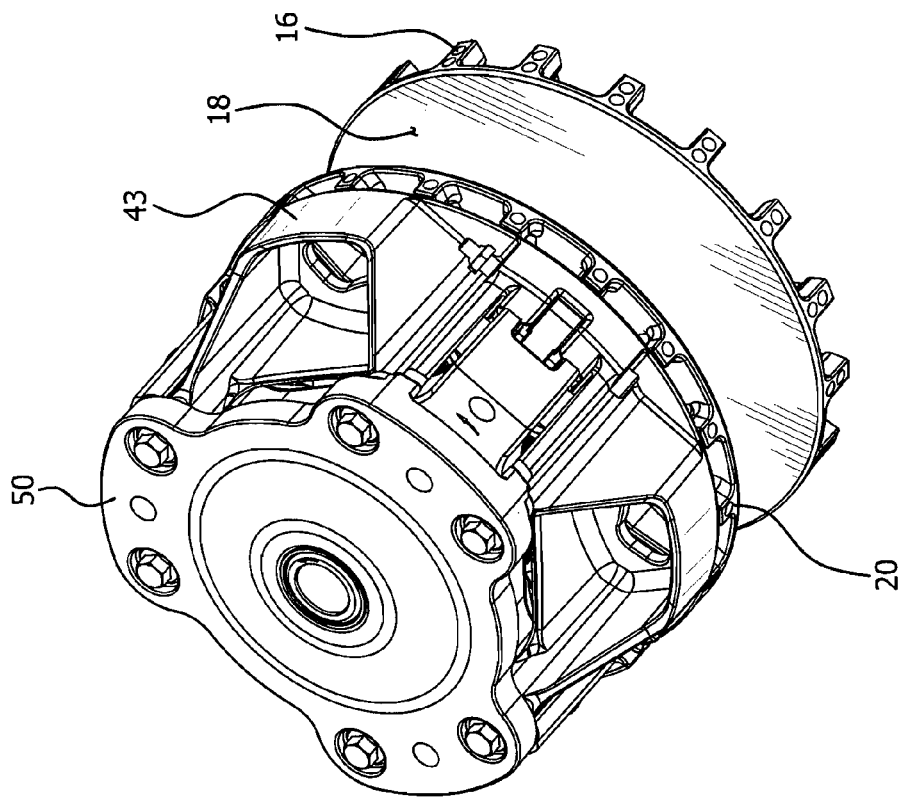
FIG. 6 is a front perspective view of the drive clutch of FIG. 2.
Figure 5:
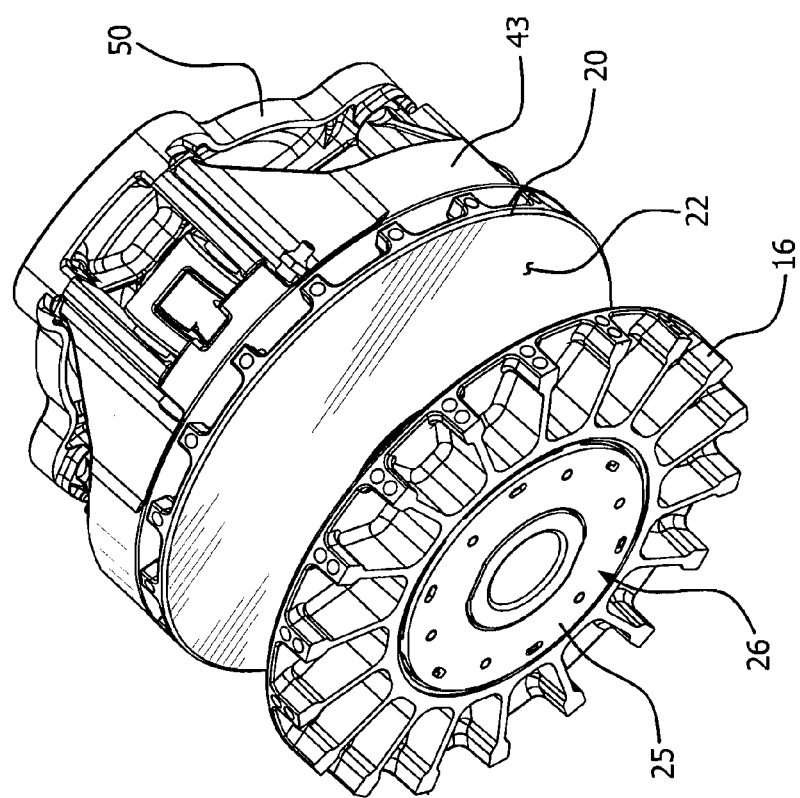
FIG. 5 is a rear perspective view of the drive clutch of FIG. 2.
Figure 7:
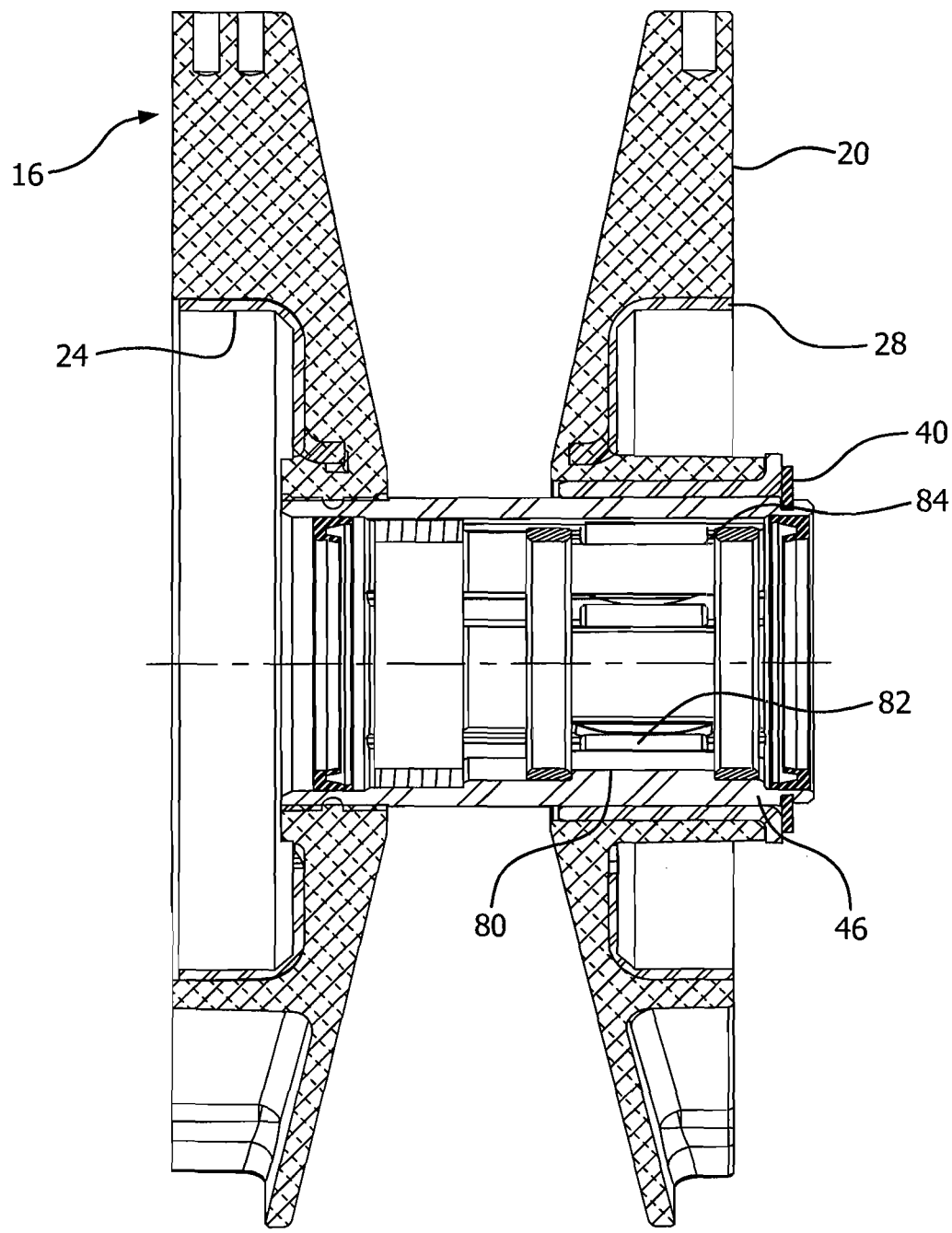
FIG. 7 is a cross-sectional view of the sheave assembly of FIG. 2.

In one preferred embodiment of the invention, the bearing assembly includes a unidirectional roller clutch (often referred to as an over-running clutch). The overrunning clutch 44 is configured to overrun during normal operation where the drive clutch is rotating the driven clutch through the drive belt B. Thus, the input shaft remains disengaged from the support housing during idle and normal operation of the CVT. As such, the sheave assembly 16, 20 is permitted to remain substantially stationary when the input shaft is rotating (i.e., the stationary and movable sheave are disengaged from the input shaft), thereby permitting the belt and driven clutch to remain substantially stationary when the engine is at idle speed and the vehicle is at rest. During backdriving (when the driven clutch is rotating faster than the drive clutch, the drive belt B will cause the stationary and movable sheaves to engage the roller clutch 44, thus creating engagement between the support housing 46 and the input shaft 12. This engagement permits the belt B to backdrive the engine. Thus, the roller clutch 44 permits engine braking when the CVT is in its idle position. As shown in FIG. 2, the roller clutch 44 is preferably positioned between an outer surface of the input shaft 12 and an inner surface 80 of the support housing 46. The roller clutch 44 preferably includes an outer race 80 mounted to or formed integral with the support housing 46. A set of internal rolls 82 are located in clutch cavities and are designed when wedged between the outer surface of the input shaft and the inner support housing 46 to transmit torque between the input shaft and the inner surface of the outer race. The rolls 82 may be retained within a roll cage 84 as is convention in the art. It is contemplated that the overrunning clutch 44 may be used in combination with a separate roller bearing in the bearing assembly. As noted above, the incorporation of a bearing assembly between the sheaves 16, 20 and the input shaft 12 permits the sheaves to be designed to always engage or pinch the belt. In this design, the input shaft 12 is disconnected from the CVT, but engageable through the centrifugal clutch.

The CVT also includes a rotatable output shaft 102 connectable to a drive axle of the vehicle (or other driven device). A rotatable split sheave secondary clutch (driven clutch) 100 is connected to the output shaft 102. The driven clutch 100 has a laterally stationary sheave 104 with an inner belt-engaging surface 106, and a laterally movable sheave 108 with an inner belt-engaging surface 110. The driven clutch 100 also includes a mechanism for normally biasing the movable sheave toward the stationary sheave. In one embodiment, the biasing mechanism includes a helix cam attached to the output shaft and located adjacent to the movable sheave. The cam has at least one cam surface formed on it. The cam surface is adapted to engage with cam followers on the movable sheave. The contact and motion of the cam followers on the cam surface produces axial translation of the movable sheave relative to the output shaft providing torque transmission between the movable sheave and the output shaft. The biasing mechanism also includes a spring which biases the movable toward the stationary sheave. Driven clutch designs are well know to those skilled in the art, including biasing arrangements for urging the movable sheave 108 toward the stationary sheave 104. See, for example, U.S. Pat. No. 6,149,540, which is incorporated herein by reference in its entirety.

An endless flexible drive belt B is disposed about the drive and driven clutches 14, 100, the belt having a pair of side drive surfaces engageable against the inner belt-engaging surfaces of the sheaves. The size of the drive belt is selected so that when the engine is at an idle speed the side surfaces of the belt firmly engage the inner belt-engaging surfaces of the sheaves, and stays in contact with the sheaves at all times.

In an alternate embodiment of the invention, the first and second sheaves are mounted on a support housing such that the first and second sheaves rotate in combination but the second sheave is mounted so that is can translate axially relative to the first sheave. In one configuration, the first sheave is attached to the support shaft and the second sheave is engaged to the support shaft through spines so that the second sheave can move axially relative to the first sheave. The axial translation of the second sheave is controlled by a tower assembly as described above. The sheave assembly (e.g., first and second sheaves and the support shaft) are mounted to the input shaft through a bearing assembly. As such the input shaft rotates independently from the sheave assembly. A centrifugal clutch is included to provide engagement between the sheave assembly and the input shaft as described above. The centrifugal clutch may be similar to the centrifugal clutch described above with a clutch hub and shoes mounted to the input shaft and a drum mounted to the sheave assembly (either to the first or second sheave.) If additional torque is needed, two centrifugal clutches can be used. An overrunning clutch can be incorporated into this embodiment as described above to provide backdriving capability.

Although the present invention has been described as using centrifugal clutches to engage the input shaft to the sheave assembly, it is also contemplated that other sheave clutch assemblies may be used to engage the sheave assembly to the input shaft. For example, it is contemplated that a clutch pack could be incorporated into the drive clutch. The clutch pack would include a clutch hub attached to the input shaft and an engagement surface connected to one of the sheaves. Friction plates between the hub and the engagement surface provide the mechanism for engaging the hub to the engagement surface.

One embodiment of the drive clutch was tested to determine its ability to handle torque while minimizing belt deterioration. In a pull test, a vehicle with the CVT including the drive clutch was fully loaded to maximum capacity. The vehicle was hooked to a utility pole on a dry, rough, concrete surface, with the tow strap length hooked low to the pole to produce the maximum traction. Vehicle was then put into high gear and accelerated slowly from idle to full throttle for approximately 5 to 10 seconds so as to cause all four wheels to spin or bring the engine to stall necessitating a shift. The CVT successfully passed the test.

A durability test was conducted on a test track with a hill constructed with two 17° inclines, 30 feet long and two 30° inclines, 15 feet long each opposing the other. The test track surface was rough concrete for good traction. The loop distance of the track was approximately 1.5 tenths of a mile. The objective was repetitive acceleration and deceleration on inclines to test durability of the centrifugal clutches and the overrunning clutch during engine braking. Engine braking was tested by starting at the bottom of the 30° incline and slowly accelerating until vehicle reaches the top of ramp then let off the throttle to test the engine braking on the downward slope. The cycle was repeated every 5th loop on the track. The rest of the drive time was to simulate normal driving as well as hard accelerations and coast down stops. Over 200 hours of testing was accumulated with no reported test failures of the drive clutch.

The longevity of the drive clutch was tested by driving the vehicle for 5000 miles without maintenance. Vehicle was driven to simulate harsh customer use. At the 5200 mile check, the drive clutch was inspected and all components were still functional.

As discussed above, one of the benefits achieved by the present invention is the reduction and preferably elimination of belt scrub at idle. Since the first and second sheaves are disconnected from the input shaft and the tower assembly (by the bearing assembly and centrifugal clutches), the sheaves can be arranged so as to always be in direct contact (i.e., pinching engagement) with the belt. Thus, there is no slack in the belt, thereby preventing slipping and burning. As a result, during start-up, the belt is in positive engagement with the sheaves once they are engaged with the input shaft. Also, the incorporation of the overrunning clutch between the input shaft and the sheave assembly allows for immediate engine braking from the belt to the input shaft when the driven clutch is rotating faster than the drive clutch.

It will be apparent to those skilled in the art that various modifications and variations can be made in the configuration of the present invention without departing from the spirit or scope of the invention. It is intended that the present invention cover such modifications and variations provided they come within the scope of the appended claims or their equivalents.

What is claimed is:

1. A drive clutch for a continuously variable transmission comprising:
    an input shaft adapted to engage with an engine drive component, the input shaft having a rotational axis;
    a support housing disposed about a portion of the input shaft such that the support housing is rotatable relative to the input shaft, the support housing having a central axis coincident with the rotational axis of the input shaft;
    a first sheave disposed about and engaged with a portion of the support housing so that the first sheave rotates in combination with the support housing, the first sheave having a rotational axis coincident with the rotational axis of the input shaft, the first sheave having a belt-engaging surface formed on a portion of one face;
    a second sheave disposed about the support housing and mounted so as to be axially movable relative to the first sheave, the second sheave having a belt-engaging surface formed on a portion of one face which faces the belt-engaging surface of the first sheave, the belt-engaging surfaces defining a groove for receiving a belt that is adapted to engage a driven clutch;
    the first and second sheaves and the support housing defining a sheave assembly;
    a bearing assembly located between the input shaft and the sheave assembly to permit rotation of input shaft relative to the sheave assembly;
    a first centrifugal clutch assembly disposed about the input shaft, the first centrifugal clutch assembly adapted to provide controlled engagement between the first sheave and the input shaft, the first centrifugal clutch assembly including a clutch hub mounted to the input shaft, an engagement surface formed on or attached to the first sheave, and means for engaging the clutch hub to the engagement surface upon the input shaft rotating at a speed relative to the sheave assembly that is above a threshold value, wherein the means for engaging the clutch hub to the engagement surface includes a plurality of shoes and springs disposed on the clutch hub, the shoes being radially displaceable in response to rotational motion of the clutch hub, the springs biasing the shoes radially toward the input shaft, and wherein the engagement surface is a drum surface mounted or formed within a recess in a rear face of either the first sheave; and
    an axial control mechanism mounted on the input shaft adjacent to the second sheave, the axial control mechanism controlling the movement of the second sheave toward and away from the first sheave as a function of the speed of the input shaft, wherein the second sheave is mounted so as to be separately rotatable from the axial control mechanism until the input shaft rotates above a threshold speed.

2. The drive clutch of claim 1 further comprising a second centrifugal clutch assembly mounted within a recess formed in a rear side of the second sheave, and wherein the second sheave has a drum positioned so as to be engaged by shoes of the second centrifugal clutch assembly, the second centrifugal clutch assembly being located between the second sheave and the axial control mechanism and providing controlled rotational engagement between the second sheave and the axial control mechanism.

3. The drive clutch of claim 1 further comprising a unidirectional overrunning clutch positioned between the input shaft and the sheave assembly, the overrunning clutch configured to not engage the input shaft to the sheave assembly when the input shaft is rotating faster than the sheave assembly, and to engage the input shaft to the sheave assembly when the sheave assembly is rotating faster than the input shaft.

4. The drive clutch of claim 1 wherein the axial control mechanism comprises a tower assembly including:
    a base disposed about the input shaft,
    a plurality of flyweights pivotally attached to the base,
    a spider disposed adjacent to the flyweights, the spider including surfaces against which the flyweights bear as the flyweights pivot, the spider being displaceable relative to the base, the spider being attached to the input shaft, and
    a spring mounted between the spider and a tower cover, the spring arranged to urge the second sheave away from the first sheave.

5. A continuously variable transmission system comprising:
    a drive clutch according to claim 1;
    a driven clutch comprising:
        a first sheave with a belt-engaging surface, the first sheave being disposed on an output shaft so as to be rotatable relative to the output shaft and substantially inhibited from axial motion relative to the output shaft;
        a second sheave with a belt-engaging surface, the belt-engaging surface of the second sheave facing the belt-engaging surface of the first sheave, the second sheave being disposed on the output shaft so as to be rotatable and axially translatable relative to the output shaft; and
        a spring for biasing the second sheave toward the first sheave; and an endless flexible drive belt disposed about the drive and driven clutches and engaged with the belt engaging surfaces, the belt providing torque transmission between the drive and driven clutches.

6. A continuously variable transmission system according to claim 5 further comprising a helix cam attached to the output shaft and located adjacent to the second sheave, the cam having at least one cam surface formed thereon, the cam surface adapted to engage with the second sheave for controlling the axial translation of the second sheave relative to the output shaft, the contact between the cam surface and the second sheave permitting torque transmission between the second sheave and the output shaft.

7. The drive clutch of claim 1 wherein the axial control mechanism is configured to urge the second sheave toward the first sheave before the shoes on each of the first and second centrifugal clutch assemblies engage their respective drums.

8. A drive clutch for a continuously variable transmission comprising:
- an input shaft adapted to engage with an engine drive component, the input shaft having a rotational axis;
- a first sheave disposed about a portion of the input shaft and having a rotational axis coincident with the rotational axis of the input shaft, the first sheave being rotatable relative to the input shaft, the first sheave having a belt-engaging surface formed on a portion of one face;
- a support housing engaged to and extending outward from the face on the first sheave and having a central axis coincident with the rotational axis of the input shaft, the first sheave adapted to rotate in combination with the support housing;
- a first centrifugal clutch assembly disposed about the input shaft, the centrifugal clutch assembly adapted to provide controlled engagement between the first sheave and the input shaft, the centrifugal clutch assembly including a clutch hub mounted to the input shaft, an engagement surface formed on or attached to the first sheave, a plurality of shoes disposed in the hub and spaced about a portion of the input shaft, the shoes mounted so as to be movable radially outward from the input shaft upon rotation of the input shaft above a threshold RPM, the radial translation of the shoes being restrained by springs, the shoes being disposed within the hub such that rotation of the input shaft produces concurrent rotation of the shoes, the shoes having a frictional surface on one end for engaging with the engagement surface on the first sheave when the shoes are radially displaced from the input shaft;
- a bearing assembly located between the input shaft and the first sheave or support housing, the bearing assembly configured to permit the first sheave and support housing to remain substantially rotationally disengaged from the input shaft;
- a second sheave disposed about the support housing and mounted so as to be axially movable relative to the support housing, the second sheave having a belt-engaging surface formed on a portion of one face and that faces the belt-engaging surface of the first sheave, the belt-engaging surfaces defining a groove for receiving a belt that is adapted to engage a driven clutch;
- a second centrifugal clutch assembly with an engagement surface formed on or attached to the second sheave, a centrifugal clutch hub, a plurality of shoes located on the hub and mounted so as to be movable radially outward upon rotation of the input shaft above a threshold RPM, the radial movement of the shoes being restrained by springs, the shoes being disposed within the centrifugal clutch hub such that rotation of the input shaft produces concurrent rotation of the shoes, the shoes having a frictional surface on one end for engaging with the engagement surface on the second sheave when the shoes are radially displaced; and
- a tower assembly including:
  - a base disposed about the input shaft,
  - a plurality of flyweights pivotally attached to the base,
  - a spider disposed adjacent to the flyweights, the spider including surfaces against which the flyweights bear as the flyweights pivot, the spider being displaceable relative to the base, the spider being attached to the input shaft, and
  - a spring mounted between the spider and a tower cover, the spring arranged to urge the second sheave away from the first sheave,
- wherein the second sheave is mounted so as to be separately rotatable from the tower assembly until the input shaft rotates above a threshold speed.

9. A drive clutch according to claim 8 wherein the bearing assembly includes a unidirectional overrunning clutch which is configured to overrun and thus does not engage the input shaft and the first sheave when the RPM of the input shaft is greater than or equal to the RPM of the first sheave, and engages the input shaft to the first sheave when the RPM of the first sheave is greater than the RPM of the input shaft.

10. A drive clutch according to claim 9 wherein the overrunning clutch is mounted between an outer portion of the input shaft and an inner portion of the support housing, and includes an outer component mounted to an inner surface of the support housing.

11. A drive clutch according to claim 9 wherein the overrunning clutch is a roller clutch.

12. A drive clutch according to claim 8 wherein the bearing assembly is mounted between an outer portion of the input shaft and an inner portion of the support housing.

13. A drive clutch according to claim 8 wherein the minimum spacing of the first and second sheaves is set by a stop mounted on the support housing that limits axial movement of the second sheave toward the first sheave and sets the belt gap so as to maintain substantially continuous positive engagement by the belt engaging surfaces and the belt.

14. A drive clutch according to claim 8 wherein the engagement surfaces of the first and second centrifugal clutches are located on the first and second sheaves, respectively, each within a recess formed in the associated sheave on the side opposite the belt engaging surface, the recesses defining drums for the respective centrifugal clutches.

15. A drive clutch according to claim 8 wherein the first and second centrifugal clutch hubs include covers for securing the shoes within the associated clutch hubs, each cover having a bearing surface on a portion of the cover facing the drum with a low coefficient of friction configured to inhibit the transfer of torque between the clutch and the drum when the clutch is disengaged.

16. A drive clutch according to claim 8 wherein the drive clutch is part of a continuously variable transmission, the transmission including a driven clutch and a drive belt engageable to the driven clutch and disposed between the belt engaging surfaces of the drive clutch, the drive clutch adapted to transmit torque to the driven clutch through the belt.

17. The drive clutch of claim 8 wherein the tower assembly is configured to urge the second sheave toward the first sheave before the shoes on each of the first and second centrifugal clutch assemblies engage their respective engagement surfaces.

18. A drive clutch according to claim 8 wherein the first and second centrifugal clutch hubs include covers for securing the shoes within the associated clutch hubs, each cover having a surface on a portion of the cover facing the drum with a high coefficient of friction configured to provide increased torque transfer between the clutch and the drum during engagement of the centrifugal clutch.

19. A drive clutch for a continuously variable transmission comprising:
an input shaft adapted to engage with an engine, the input shaft having a rotational axis;
a sheave assembly including first and second sheaves mounted on a support housing so as to rotate in combination with the support housing, one of the sheaves being axially movable relative to the other, the sheave assembly being disposed about the input shaft and being rotationally disconnected from the input shaft;
a bearing assembly located between the input shaft and the sheave assembly for providing some support for the sheave assembly on the input shaft while permitting rotation of input shaft relative to the sheave assembly,
a first centrifugal clutch assembly disposed about the input shaft, the first centrifugal clutch assembly adapted to provide controlled engagement between the first sheave and the input shaft, the first centrifugal clutch assembly including a clutch hub mounted to the input shaft, a torque transfer surface formed on or attached to the sheave assembly, and means for frictionally engaging the clutch hub to the torque transfer surface upon the input shaft rotating at a speed relative to the sheave assembly that is above a threshold value, the means for engaging the clutch hub to the torque transfer surface include a plurality of shoes and springs disposed on the clutch hub, the shoes being radially displaceable in response to rotational motion of the clutch hub, the springs biasing the shoes radially toward the input shaft, and wherein the torque transfer surface is a drum surface mounted or formed within a recess in a rear face of the first sheave; and
an axial control mechanism mounted on the input shaft adjacent to the second sheave, the axial control mechanism controlling the movement of the second sheave toward and away from the first sheave as a function of the speed of the input shaft, wherein the second sheave is mounted so as to be separately rotatable from the axial control mechanism until the input shaft rotates above a threshold speed.

20. The drive clutch of claim 19 further comprising a second centrifugal clutch assembly mounted within a recess formed in a rear side of second sheave, and wherein the second sheave has a drum positioned so as to be engaged by shoes of the second centrifugal clutch assembly, the second centrifugal clutch assembly being located between the second sheave and the axial control mechanism and providing controlled rotational engagement between the second sheave and the axial control mechanism.

21. The drive clutch of claim 19 further comprising a unidirectional overrunning clutch positioned between the input shaft and the sheave assembly, the overrunning clutch configured to not engage the input shaft to the sheave assembly when the input shaft is rotating faster than the sheave assembly, and to engage the input shaft to the sheave assembly when the sheave assembly is rotating faster than the input shaft.

22. A drive clutch according to claim 19 wherein a minimum spacing of the first and second sheaves is set by a stop mounted on the support housing that limits axial movement of the second sheave toward the first sheave.

23. The drive clutch of claim 19 wherein the axial control mechanism is configured to urge the second sheave toward the first sheave before the shoes on each of the first and second centrifugal clutch assemblies engage their respective drums.

* * * * *